(12) United States Patent
Porteus et al.

(10) Patent No.: US 6,933,433 B1
(45) Date of Patent: Aug. 23, 2005

(54) METHOD FOR PRODUCING PLAYLISTS FOR PERSONALIZED MUSIC STATIONS AND FOR TRANSMITTING SONGS ON SUCH PLAYLISTS

(75) Inventors: Bradford Evan Porteus, Oakland, CA (US); Ranga Reddy Beeram, Edison, NJ (US); Damian Franken Manning, New York, NY (US)

(73) Assignee: Viacom, Inc., New York, NY (US)

( * ) Notice: Subject to any disclaimer, the term of this patent is extended or adjusted under 35 U.S.C. 154(b) by 833 days.

(21) Appl. No.: 09/709,114

(22) Filed: Nov. 8, 2000

(51) Int. Cl.⁷ .............................. G10H 1/18; G10H 7/00
(52) U.S. Cl. ................................................. 84/615
(58) Field of Search ........................... 84/600, 609, 615

(56) References Cited

U.S. PATENT DOCUMENTS

| | | |
|---|---|---|
| 5,541,638 A | 7/1996 | Story |
| 5,616,876 A | 4/1997 | Cluts |
| 5,668,788 A | 9/1997 | Allison |
| 5,726,909 A | 3/1998 | Krikorian |
| 5,798,921 A | 8/1998 | Johnson et al. |
| 5,819,160 A | 10/1998 | Foladare et al. |
| 5,924,071 A | 7/1999 | Morgan et al. |
| 6,012,086 A | 1/2000 | Lowell |
| 6,026,439 A | 2/2000 | Chowdhury et al. |
| 6,031,797 A | 2/2000 | Van Ryzin et al. |
| 6,038,591 A | 3/2000 | Wolfe et al. |
| 6,067,562 A | 5/2000 | Goldman |
| 6,088,722 A | 7/2000 | Herz et al. |
| 6,248,946 B1 * | 6/2001 | Dwek ........................... 84/609 |
| 6,581,103 B1 * | 6/2003 | Dengler ....................... 709/231 |
| 6,662,231 B1 * | 12/2003 | Drosset et al. .............. 709/229 |
| 2003/0229537 A1 * | 12/2003 | Dunning et al. .............. 705/10 |

FOREIGN PATENT DOCUMENTS

| | | |
|---|---|---|
| EP | 0 984 584 A1 | 3/2000 |
| WO | WO00/59227 | 10/2000 |

OTHER PUBLICATIONS

Fraser, "Imagine Radio: The Future of Music Radio?", CBO Morning—The Internet Training Company, Jul. 27, 1999.

* cited by examiner

Primary Examiner—Jeffrey W Donels
(74) Attorney, Agent, or Firm—Fitzpatrick, Cella, Harper & Scinto

(57) ABSTRACT

A method of producing a playlist of music for a personal music station comprising the steps of assigning a artist block rating to each of a plurality of predefined artist blocks, using the artist block rating to produce an artist rating for each artist in the artist block, generating a list of artists, wherein the number of times each artist appears in the list is related to the artist rating for each artist, randomly selecting artists form the list of artists, producing a prioritized list of songs for each of the randomly selected artists, and selecting songs from the prioritized list of songs for inclusion in a playlist. The playlist can be subsequently edited to create a playlist having a less than a first predetermined number of songs by each of the artists for broadcast within a predetermined time period and having less than a second predetermined number of adjacent songs by each of the artists. A method of distributing songs on a personal music station using the playlist is also included.

20 Claims, 4 Drawing Sheets

JAZZ

| I want to hear it | Never | Sometimes | A lot | Artists like... |
|---|---|---|---|---|
| Jazz Vocalists | ◉ | ◎ | ◎ | Louis Armstrong, Billie Holiday, Ella Fitzgerald |
| Mainstream Jazz | ◉ | ◎ | ◎ | Miles Davis, Charlie Parker, Joe Williams |
| Smooth Jazz | ◉ | ◎ | ◎ | Kenny G., George Benson, David Sanborn |
| Swing | ◉ | ◎ | ◎ | Count Basie, Royal Crown Revue, Brian Setzer Orchestra |
| Traditional Jazz | ◉ | ◎ | ◎ | Fats Waller, Bessie Smith, Jelly Roll Morton |

*FIG. 2*

METHOD FOR PRODUCING PLAYLISTS FOR PERSONALIZED MUSIC STATIONS AND FOR TRANSMITTING SONGS ON SUCH PLAYLISTS

BACKGROUND OF THE INVENTION

This invention relates to methods and apparatus for transmitting music over a communications network, and more particularly, to methods and apparatus for creating a playlist of music for use with personalized music stations.

The transmission of music over the Internet is well known. Several Internet services have been developed to permit users to select particular types of music to be transmitted to the user's equipment. On-line music services allow various options, including the option of listening to a digital music programming on which the songs are programmed by music programming professionals; listening to a station that plays music selected according to the user's preferences; or listening to programming that plays music according to the preferences of other users. Typically, the stations programmed by professionals are divided into categories, such as rock, oldies, classical, etc. The professional programming is programmed by professional music directors who choose the songs and the frequency of their rotation within any given set of music programming. Except for choosing a broad category of music type, the listener has no input into the music that gets played on the professional stations, other than being able to skip ahead in their playlist as desired.

User-defined stations are typically created after the user provides input on their musical preferences. This transmission of music to a particular user has been referred to as a "personalized music station" or "personal music station". To create such personal music stations, the music service provider generally requests that the user provides some preferences with respect to music type. Then the music service provider either selects a predetermined playlist or creates a playlist in response to the user preferences. The playlist subsequently selects and sequences the songs that are transmitted to the user.

However, playlists created in response to user preferences may not adequately represent prolific artists, or can include too many songs by little-known, minor, or brand-new artists. If the music service has a large database of available songs, an indication of interest in broad categories of music type, such as rock, oldies, classical, etc. may not sufficiently narrow the focus of the playlist to meet the user's expectations. It would be desirable to simplify the playlist building process, provide for a greater ability to keep station content current, and relevant, improving the diversity of playlists for user stations in general, and ensuring automatic compliance with broadcast requirements.

SUMMARY OF THE INVENTION

This invention provides a method of producing a playlist of music for a personal music station comprising the steps of assigning ratings to at least one of a plurality of predefined artist blocks, using the artist block rating to produce artist ratings for the artists included in the artist block, generating a list of artists, wherein the number of times each artist appears in the list is related to the artist rating for each artist, randomly selecting artists from the list of artists, producing a prioritized list of songs for each of the randomly selected artists, and selecting songs from the prioritized list of songs for inclusion in a playlist.

The playlist can be subsequently optimized, based on requirements as needed, to create a playlist having less than a first predetermined number of songs by each of the artists for broadcast within a predetermined time period and having less than a second predetermined number of adjacent songs by each of the artists.

This invention also encompasses the use of the above method to deliver songs to users by way of a communications network.

BRIEF DESCRIPTION OF THE DRAWINGS

FIG. 2 is graphical user interface used by a user to designate music preferences;

DESCRIPTION OF THE PREFERRED EMBODIMENTS

The present invention is particularly suitable for, and the following description relates primarily to, the transmission of digital media and/or information over a communications network, and more specifically to the transmission of musical songs or tracks selected in accordance with the preferences of a user. However, it will be readily appreciated that the system and method of the present invention can also be used for other types of broadcast content, such as video, or any other programmable media distribution. In addition, the term "song" as used in the following description, is intended to embrace any audio content whether or not it includes singing, spoken words, or instrumentals.

Figure 1:
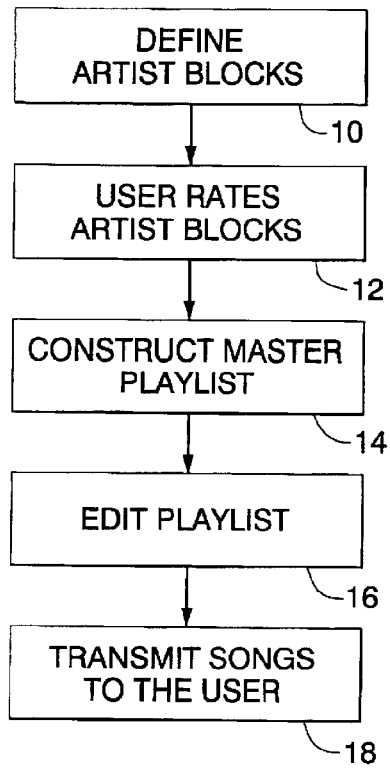
FIG. 1 is a flow diagram that illustrates the steps of the method of this invention.

This invention provides a method and apparatus for producing a playlist of songs to be played on a personal music station. For the purposes of this description, stations and playlists are, respectively, online music stations and the lists of songs that are chosen for play on such stations. FIG. 1 shows a block diagram that illustrates the steps in the method of the present invention. A two-stage process is used to generate a playlist for personal music stations. These stages are referred to as the rating stage and the lottery stage. In the rating stage, artists are given ratings in response to the preferences of a user. The higher the rating, the more an artist will be represented in any playlist on the station. In addition, particular songs are rated and assigned priorities that take the song ratings into account. Once these artist ratings and song priority ratings are specified, a playlist is generated in the lottery stage each time the station is launched. The user's preferences can be edited at any time. Then the revised preferences will be used to generate future playlists.

As illustrated in block 10 of FIG. 1, the music service initially defines a plurality of artist blocks. These artist blocks are groupings of artists based on either genre of music (e.g., Smooth Jazz), theme (e.g., Jazzfest Favorites), label (e.g., Bluenote Artists), or any other possible artist groupings. Each artist block is defined by a list of artists that make up the block. Particular artists can be assigned to more than one artist block.

The music service provider assigns a preliminary rating (also called a weight) to each of the artists within each artist block. In the preferred embodiment of the invention, the preliminary rating represents the opinion of a professional music director. The preliminary rating reflects the music director's opinion of the relative preference for specific artists relative to each other within a given block. In the preferred embodiment of the invention, the rating is a numerical rating, such as 1 through 5, with 1 indicating that the artist should be selected onto a playlist at the relatively lowest frequency, and a rating of 5 meaning that the artist should be selected at the relatively highest frequently in the playlist. While a numerical rating system is preferred, other rating categories could also be used in place of the numeric scale, such as, undesirable, somewhat desirable, desirable, etc.

In the preferred embodiment of the invention, the user is initially presented with one or more general categories of music, hereinafter referred to as "supergenres". The supergenres identify broad classes of music, such as rock, classical, etc. The artists for music in each of the supergenres, have been previously classified in the artist blocks. Once a supergenre has been selected, the user is presented with a plurality of artist blocks for each supergenre, along with the names of selected artists that have been categorized in each block when appropriate. The user is then asked for his or her preferences relating to the desirability of including such blocks into his/her station's rotation, as shown in block 12. In the preferred embodiment of the invention, the user is given four choices for the user's interest in hearing songs from each artist block, ranging from "Never" to "A Lot", with two levels of "Sometimes" in between. The user's expression of interest is used to adjust the preliminary ratings for all of the artists in that block. For example, if the user's interest in hearing songs from a particular block is "A Lot", then the preliminary rating for all of the artists in that block will be increased by 1. If the user's interest in songs of the block is the higher level of "Sometimes", then the rating for all of the artists in that block will not be changed. If the user's interest in songs of the block is the lower level of "Sometimes", then the rating for all of the artists in that block will be decreased by 1. If the user's interest in hearing songs from the block is "Never", the artists in that block will not be played on the user's station, unless those artists appear in other block that are not given a "Never" rating, or, if the user has specifically independently otherwise rated an artist in question (through search or browsing for artists on the site as discussed below).

By rating the block, the user has effectively identified a plurality of artists and assigned ratings to them. The user need not know the names of all of the artists that have been categorized into a specific block. Aggregately, the user's artist ratings, established through selections of artist blocks or otherwise, are subsequently used to construct a master playlist as shown in block 14. The master playlist is then edited as shown in block 16 to produce a playlist of particular songs. That playlist is subsequently used to determine the songs to be transmitted to the user as shown in block 18.

To produce the master playlist, artists are chosen according to the rating assigned to them, and individual songs by those artists are selected for inclusion in the master playlist. A lottery system is used. Each time a user initiates a listening session on their personal music station, a different playlist is generated and used to determine the songs and sequence of the songs that are delivered to the user. In the preferred embodiment of this invention, each playlist contains 80 songs. However, a greater or smaller number of songs could be used as desired The playlist is determined by using the artist and song ratings (also referred to as weights), by content licensing compliance rules (such as the requirements of the Recording Industry Association of America (RIAA)), and possibly by other system rules that must be followed when creating an actual list of songs to be broadcast from a playlist. For example, such other system rules may specify: that a single playlist may not have more than three songs by the same artist; that a single playlist may not include the playing of more than two consecutive songs by the same artist; that a single playlist may not include the playing of more than two consecutive songs from the same recording or box-set; and that a single playlist must have at least N songs or involve at least X hours of content. Prior to using a playlist, it is validated by verifying that it satisfies all of these requirements.

FIG. 2 is an example of a graphic user interface 20 that can be used to enter the user's preferences with respect to particular artist blocks within a supergenre. In the preferred embodiment, the user is presented with a series of buttons 22, 24, 26 and 28 corresponding to the user's interest in hearing music from the artists in the artist block, and ranging from "Never" to "A Lot". If the user chooses the button 22 in the "Never" column, then no information about the artist block is sent to the music service, and the artists in that block will never be played on the user's station (unless the artist also appears in a different artist block that is selected, or the artist has been individually selected). In the preferred embodiment, the "Never" button is the default setting.

If the user chooses any of the other three buttons in the block, then all of the artists in that block are added to the station artist list. Once a user shows an interest in hearing artists in a particular artist block, identification numbers for all the artists in that block are stored in an artist table by the music service. This table functions as a list of all the artists who might potentially be played on the station.

The music service also records and stores the artist ratings for each of the artists in the blocks chosen by the user. In the preferred embodiment of the invention, the rating is determined as follows. All the artists in the artist table are given a preliminary rating of, say 2, 3, or 4, by a professional music director at the music service provider. For example, the service might give the "primary" (most notable) artists in the Traditional Jazz block preliminary ratings of 4 out of 5, while "secondary" artists might get a preliminary rating of 2 out of 5. These preliminary ratings are programmed by the music director.

If, for example, a user chooses the "A Lot" button in the Traditional Jazz block, all of the artists in that block would have their preliminary ratings bumped up by 1. The primary artists become 5s and the secondary artists become a 3s. These new ratings are stored by the music service in the user's MapUserArtist table. If the user chooses the higher level of the "Sometime" buttons, no change is made to the preliminary rating. The first artist remains a 4 and the second a 2. If the user chooses the lower level of the "Sometime" buttons, all of the artists in the category have their preliminary ratings downgraded by 1. The first artist becomes a 3 and the second a 1.

Individual artist ratings can be fine-tuned as discussed below. By rating artist blocks, and fine-tuning the ratings of individual artists, the user supplies the music service with the information it needs to create the artist and artist ratings tables. In effect, the user has created a list of artists, drawn from the music service database, and has assigned each artist a numerical rating, from 0 to 5. The music service need only store artist ratings of 0 for users to the extent that the users manually made such ratings at any time using the service— thereby ensuring that the user will never hear that particular artist. Whenever a user sets a rating for a specific artist—be it 0, 1, 2, 3, 4, or 5, that rating is "locked in" and will override all other block-based selections and references made in the future Whenever the user launches a music station, the music service starts a selection process to choose the songs for the playlist. First, the music service makes a list of the songs that are available for playing. This is accomplished by taking all of the artists from the MapUserArtist table and combing the database to assemble all of the playable songs for those artists. A "ping pong ball" or "Lottery" selection scheme is used to pick a predetermined number of artists from the MapUserArtist table. In the preferred embodiment of the invention, the selection scheme is mathematically impacted by the artist ratings and is used to generate a list of artists.

An artist priority is established for each artist in the artist blocks of interest. The artist priority is derived from the rating that was assigned to the artist in the rating stage, described above. In the preferred embodiment, the artist priority is an exponential function of the numerical rating that is found by using the formula: Artist Priority=$2^{(r-1)}$, where r is the numerical rating. For example, if a first artist has a rating of 1 on the MapUserArtist table, then the artist priority for all of the first artist's songs is 1. If a second artist has a rating of 5, then the artist priority for the second artist's songs is 16. If a third artist has been given a rating of 0, then of course the third artist never makes it to this stage because the user has elected not to hear his songs.

It should be understood that the artist priority need not be an exponential function of the artist rating. For example, the artist priority could be a linear function of the rating, or it could be some other function of the rating, as long as it is somehow representative of the rating. Such schema are representative of an effort to establish certain artists as being relatively higher in rotation (based on probabilities) than others—i.e. "music programming:"

A list of artists is then generated with each artist appearing a number of times determined by the artist priority rating. This process is analogous to a ping-pong ball selection technique where ping-pong balls are labeled with artist names and placed in a container. The number of balls with each artist's name is related to the artist priority rating. For example, if an artist has a priority rating of 4, then, depending on the schema, say, eight balls labeled with that artist's name would be added to the container. The list is then created by withdrawing a predetermined number of balls. In this manner, artists with higher priority ratings are more likely to appear on the list.

To create the list, a sweep is made through the complete list of artists to randomly pick a predetermined number of artists. Thus, the artists are selected in a manner that takes the artist weight into consideration.

Every song in the database is given a song priority rating by the music service. This rating is at the discretion of the music service, and the user has no say in the matter. In the preferred embodiment, the numerical song ratings from 1 to 5 are used. As with the artist priority, the song priority is an exponential function of the numerical song rating that is found by using the formula: Song Priority=$2^{(r-1)}$, where r is the numerical song rating. For example, if a first song has a rating of 1, then the song priority for that song is 1. If a second song has a rating of 5, then the song priority for the second song is 16. As with the artist priority, it should be understood that the song priority need not be an exponential function of the song rating. For example, the song priority could be a linear function of the song rating, or it could be some other function of the rating, as long as it is somehow representative of the rating.

Figure 3:
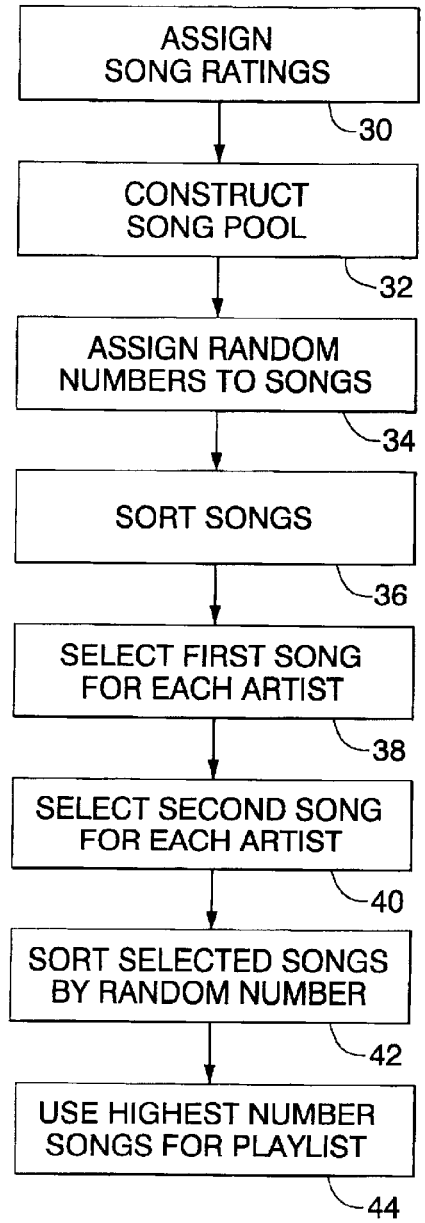
FIG. 3 is a flow diagram that illustrates the steps used to generate a master list of songs.

A ping pong ball scheme is also applied to the available songs for each artist. FIG. 3 is a flow diagram that illustrates the steps used to generate a master list of songs. As shown in block 30, each song in the system database by the selected artists is assigned a song rating, and that rating is used to establish a song priority. Block 32 shows that a pool of the songs by the selected artists is constructed by taking the song priorities into consideration. Again using the ping-pong ball selection process, a song priority of 1 contributes one ball to the pool, whereas a song priority of 8 contributes 8 balls to the pool. All balls in this song pool are assigned a random number between zero and one, as shown in block 34. Block 36 shows that the song pool is then sorted by random number. The assumption is that a higher rated song has a greater probability of getting a higher value random number assigned to it. Next, block 38 shows that the first available song for each artist in this pool of songs is picked and saved into a separate list. Then the invention attempts to pick another song for each artist that was not picked in the previous step, as shown in block 40. If such songs are available, they are added to the second list. Finally, the second list of songs are ordered by a random number, as shown in block 42, and a first number N of songs are picked to form the playlist as shown in block 44, where N represents the predetermined number of songs in the playlist.

Internet music stations cannot play more than three songs from the same album in a three-hour period, and only two songs of the same artist can be played in a row. The preferred embodiment of this invention makes the rule even stricter so that no more than two recordings from the same artist are selected on any single playlist.

Figure 4:
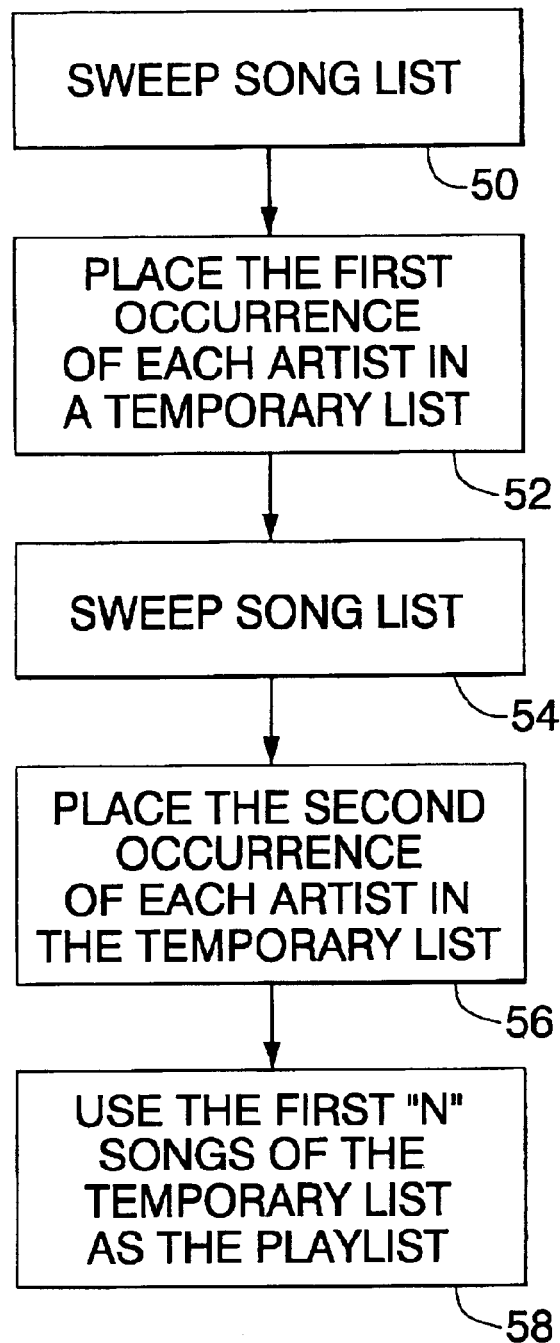
FIG. 4 is a flow diagram that illustrates the steps used to edit the master list of songs.
Figure 5:
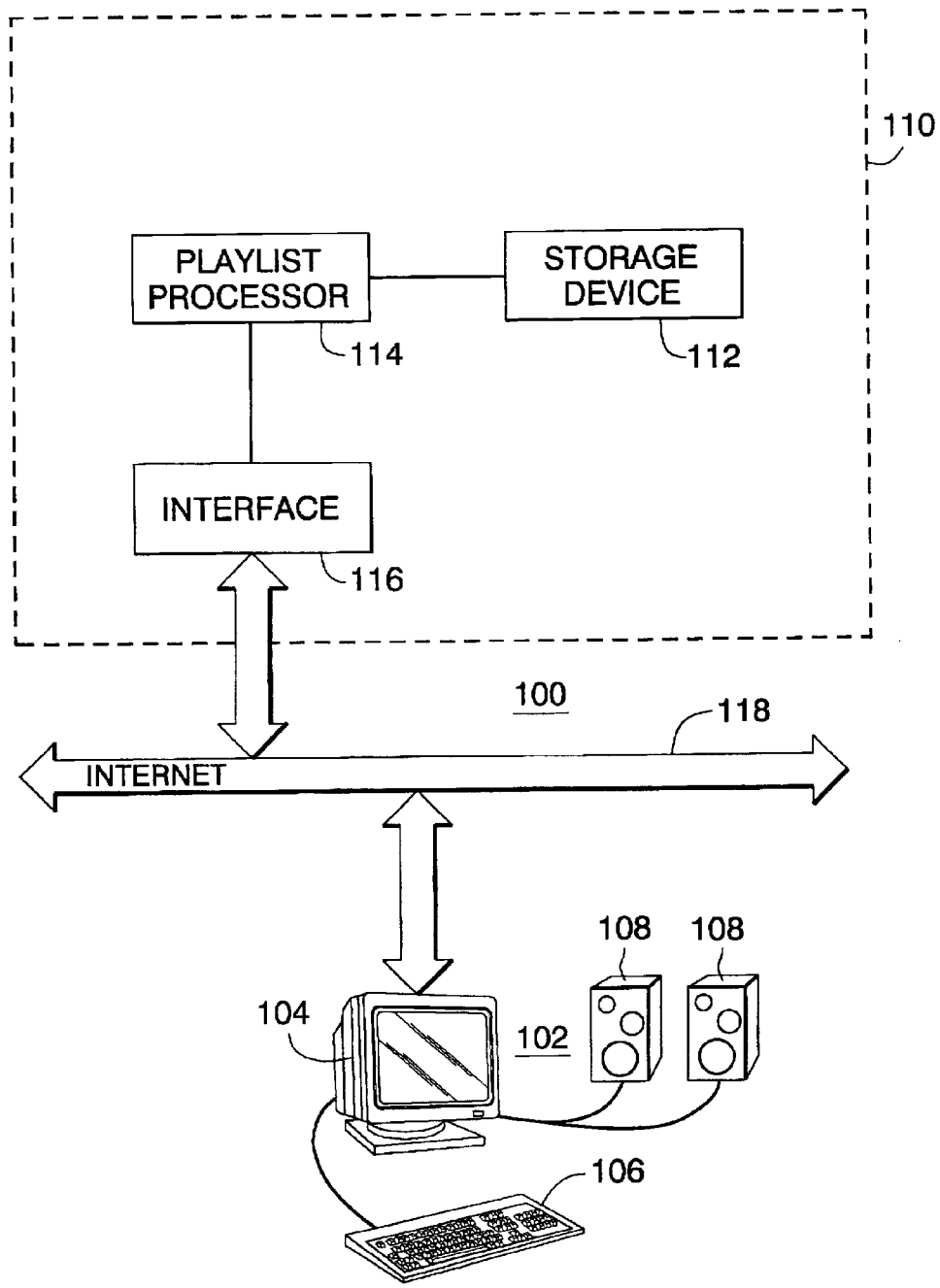
FIG. 5 is a block diagram of an apparatus that can be used to carry out the method illustrated by FIG. 1.

The last step in making the playlist is to edit the song list, making sure that no artist has more than two songs. FIG. 4 is a flow diagram that illustrates the steps used to edit the master list of songs. Block 50 shows that the song list is swept from top to bottom. The first occurrence of every artist is placed into a temporary list, as shown in block 52. This results in two lists: a temporary list with each artist represented only once (by the song with the highest priority value), and the remains of the master song list. A second sweep, just like the first, is made of the remains of the master song list, as shown in block 54. This picks out the second occurrence of every artist, again taking one song per artist (the song with the highest priority value) from the diminished master song list. The results of this second sweep are thrown into the temporary list along with the results of the first sweep, as shown in block 56, and the whole list is placed in order by song priority value. Now the two lists look like this: a temporary list with one or two songs by every artist, and an even further diminished master song list that now has nothing but the third, fourth, and fifth songs by artists (and perhaps many more).

The temporary list contains no more than two songs by each artist. The first N songs from this list are selected to become the final playlist, as shown in block 58. In the preferred embodiment, N=80. The song order remains in place, that is, the sequence in which the user will hear the songs.

If it were decided in the future that a user station should be able to play three songs by the same artist, then a third editing sweep would simply be made. The results would then be thrown into the temporary list along with the results of the first two sweeps, and the list would be sorted as before. It would be very unlikely to have three consecutive songs by the same artist on the list, but it would be possible. A simple scrambling process can be added at the very end to eliminate the possibility that three songs by the same artist lie adjacent to each other.

The professional stations and the user stations use slightly different procedures to choose songs randomly. A simplified lottery stage is also used for selecting songs for playlists of the professional stations. When a music director goes about putting together a station, or an invited artist puts together a Guest DJ station, he or she chooses a list of songs and rates them with a value between 1 and 5. The rating stage for artists is completely bypassed. In the preferred embodiment, of this invention a list must have enough songs to comply with Recording Industry Association of America (RIAA) requirements. After the songs are rated, the process is the same as it is for user stations. The songs are assigned random numbers, and the master list of songs is compiled by placing the songs in order from highest to lowest. The editing sweeps make sure that no artist is represented more than twice, and the songs with at least the top 50 highest priority numbers make up the final playlist.

If a station has less than 80 songs to choose from, the playlist ends after the last song. Likewise, on any station (user or professional), after the last song has been played, the playlist is finished and it is discarded. A different playlist is generated and the station continues as if it were relaunched.

To illustrate the editing sweeps, here are the top songs from a sample master song list.

| Artist | Song | Priority Value |
| --- | --- | --- |
| Beethoven | Concerto #3 | 1.0 |
| Brahms | Concerto #3 | 0.99963982 |
| Debussy | Concerto #4 | 0.99947635 |
| Tchaikovsky | Concerto #2 | 0.99872971 |
| Chopin | Concerto #2 | 0.99839727 |
| Debussy | Concerto #2 | 0.99629876 |
| Beethoven | Concerto #5 | 0.99387625 |
| Mozart | Concerto #2 | 0.99198374 |
| Debussy | Concerto #3 | 0.98965357 |
| Liszt | Concerto #3 | 0.98634865 |
| Haydn | Concerto #2 | 0.98438572 |
| Handel | Concerto #1 | 0.98327686 |
| Mussorgsky | Concerto #7 | 0.96432865 |

In the first editing sweep, the song with the highest randomly assigned priority value is selected for each artist and put into Temporary List #1. That leaves the remains of the master song list with nothing but second, third, fourth, fifth, and sixth occurrences of each artist. Temporary List #1 is sorted by priority value and set aside for a moment.

In the second editing sweep, another priority is selected for each artist and put into Temporary List #2. This time the song with the second-highest priority value is selected for each artist (which is the same as taking the highest random value from the current remains of the master song list). That leaves the remains of the master song list with nothing but third, fourth, fifth, and sixth occurrences of each artist. Temporary List #2 is dumped into Temporary List #1 in the next step.

If any artist were only in the original master song list once, its one occurrence would be taken out for Temporary List #1, so that artist would not appear on Temporary List #2. The two temporary lists are merged and then sorted to preserve the original priority order that was set by the song priority numbers. Notice that if in the original master song list, a first artist had five songs with higher priority values than any of a second artist's songs, the second artist would still make the list.

Artists of equal weight should appear on a user's playlist with equal frequency, on average, regardless of artist block weights, or number of songs available in library of encoded music. Artists with higher weights should appear relatively more frequently on playlists than artists with lower weights (on average), i.e. 5>4>3>2>1. Artists rated "0" should never appear on a user's station. The same artist should not be heard more than 3 times total on any given playlist. The same artist shouldn't be appear more than 2 times in a row on any given playlist.

In addition, it would be desirable that the relative frequency of songs (for any given artist) should be distributed across the entire library of encoded songs. Songs with relatively higher song ratings should be heard more often than songs with lower song ratings. The same song should never appear more than once on the same playlist. No song should ever make up more than 50% of all songs heard by any given artist.

With this invention a music service could build numerous playlists for every professional station every day, ensuring RIAA compliance, and then delivering those to users on some sort of random basis. This would permit the computations to be performed on an off-line database. Such cached playlists could be updated on a daily basis so as to take account for daily music programming updates the music service music directors.

The personal preferences of a listener-created station may be viewed or changed by the creator, e.g. at the system's Web site or through an edit button on the listener's tuner. Personalized stations may also be made publicly available to other listeners. The web-based tuner used by listeners may include an interface for displaying information such as the artist name, song title, and album name. Links can also be provided for additional information on artists or to purchase the corresponding recording. Advertising can be inserted both within the music programming itself and in banner ads displayed on the tuner.

There are three ways to go back and alter the ratings later if the user decides that he or she would like the station to play different music. At any time, the user can choose to edit the artist ratings. During editing, the user will have the option to add new supergenres on a screen very similar to that used in the initial station set-up. Then the user would be shown the artist blocks that are currently stored in the table MapArtistGenre (with the addition of any new artist blocks resulting from any supergenre that may have been added). At this point, the user may make changes to the ratings. If the user chooses to set an artist block to rating "Never", all of the artists in that artist block will be removed from the user's station (unless they are also included in other artist blocks that have been selected). Every artist in that artist block is given a rating of 0, which ensures that they won't get played on the station.

If the user really likes an artist that is heard while the music station is playing, the user can increase that artist's rating so that it is played more in the future. There is an option on the user interface tuner (the window that shows what's playing on the station) to change the rating of that particular artist. This allows the user to fine-tune the artist ratings. Instead of changing the rating of the entire artist block, the user can increase, decrease, or eliminate the amount that individual artist appears on their station.

If the user never wants to hear a particular artist on the station again, the "Never" button can by activated to assign a rating of 0 to that artist in the user's MapUserArtist table. Ratings of 1 through 5 can also be assigned to individual artists. If a 5 rating is assigned to an artist, when the user launches the station, songs of that artist are likely to be played again. The ratings that the user assigns to individual artists in this way override the existing ratings in the MapArtistGenre table (which had been created when the user rated the artist block as a whole).

The preferred embodiment of this invention also includes a Search option. The user can look for those artists that the user especially likes, or especially detests, and edit their ratings in a box like the one above. If the user wants to hear a particular artist frequently, the user can enter the artist's name in the Search box and choose to edit its rating. The manual search affects the MapUserArtist table in the same way that fine-tuning, described above, does. In addition, this feature provides a way for a user to can add an artist to the music station that isn't included in any of the selected artist blocks. For example, if a particular artist were the only country singer that the user likes, then the user would not choose an entire block of Country artists. Instead the user would manually add that artist to his or her station using the Search option.

FIG. 4 is a simplified functional block diagram of the system 100 that incorporates the above method. User equipment 102, which can include a personal computer 104, an input device, such as a keyboard 106, and an output device, such as speakers 108, is used to provide information to the music service provider equipment 110 and to receive songs from the music provider. While the user equipment is illustrated as a personal computer, other types of user equipment, including but not limited to a mobile phone, mobile radio, fixed receiver, home stereo, satellite television, hand-held device, car, etc., could also be used to receive playlists from the music provider. The music service provider equipment includes a storage device 112 for storing the songs, a playlist processor 114 and a network interface 116 for connection to a communications network, such as the Internet 118. In the preferred embodiment of the invention, the songs are preferably stored as digital files in a file server or similar computer storage device. The playlist processor, which can be a computer, actually decides when, in what order, and how often the songs in a playlist are played. To make this determination, the playlist processor receives the preliminary artist ratings and the user artist block ratings, and adjusts the preliminary artists rating in response to the user artist block ratings as discussed above. The playlist processor also receives the ratings for the individual songs. The individual song ratings can be supplied by the music service professionals or by the user.

This invention uses relative probabilities to select artists, and relative probabilities to select songs from within that artist's repertoire of recorded music. While the present invention has been described in terms of what is at present believed to be its preferred embodiments, it will be apparent to those skilled in the art that various changes can be made to the preferred embodiments without departing from the scope of the invention as defined by the following claims.

What is claimed is:

1. A method of producing a playlist of music for a personalized music station, the method comprising the step of:

assigning an artist block rating to at least one of a plurality of predefined artist blocks, each artist block comprising a grouping of a plurality of artists related in some way;

using the artist block rating to produce an artist rating for each artist in the artist block;

generating a first list of artists from the artist block, wherein the number of times each artist appears in the first list is related to the artist rating for each artist;

randomly selecting artists from the first list of artists;

producing a prioritized list of songs for each of the randomly selected artists; and selecting songs from the prioritized list of songs for inclusion in a master playlist.

2. A method of producing a playlist of music for a personalized music station according to claim 1, further comprising the step of:

editing said master playlist to create a second playlist having less than a first predetermined number of songs by each of said artists and having less than a second predetermined number of adjacent songs by each of said artists.

3. A method of producing a playlist of music for a personalized music station according to claim 1, wherein the step of using the artist block rating to produce an artist rating for each artist in the artist blocks, comprises the steps of:

assigning a preliminary rating to each artist categorized within each of the artist blocks; and adjusting the preliminary rating for each artist categorized within each of the artist blocks in response to the artist block rating for each of the artist blocks.

4. A method of producing a playlist of music for a personalized music station according to claim 2, wherein the step of editing said list of songs comprises the steps of:

selecting a first occurrence of each artist in the master list;

selecting a second occurrence of each artist in the master list; and generating a new list including the first and second occurrences of each artist.

5. A method of producing a playlist of music for a personalized music station according to claim 1, wherein the steps of randomly selecting artists from the list of artists; producing a prioritized list of songs for each of the randomly selected artists; and selecting songs from the prioritized list of songs for inclusion in a master playlist, are repeated following a transmission of a last song on the playlist.

6. A method of producing a playlist of music for a personalized music station according to claim 1, wherein the list created in the step of generating a list of artists from at least one of the artist blocks includes multiple occurrences of at least some of the artists, wherein the number of occurrences is representative of the artist rating.

7. A method of producing a playlist of music for a personalized music station according to claim 1, wherein the step of generating the first list of artists comprises the steps of:

producing a master list of the artists, the master list including multiple occurrences of said artists, wherein the number of occurrences is proportional to the artist rating;

assigning a random number to each artist in the master list of artists; and using the random number to select artists for the first list of artists.

8. A method of producing a playlist of music for a personalized music station according to claim 1, wherein the step of producing a prioritized list of songs comprises the steps of:

assigning a song rating to each of the songs;

producing a master list of the songs, the master list including multiple occurrences of said songs, wherein the number of occurrences is proportional to the song rating;

assigning a random number to each song in the master list; and using the random number to select songs for the prioritized list.

9. A method of producing a playlist of music for a personalized music station according to claim 1, further comprising the step of:

adding additional artists to the list of artists; and assigning a rating to the additional artists.

10. A method of producing a playlist of music for a personalized music station according to claim 1, further comprising the step of:

adjusting the artist rating for selected ones of the artists to produce an adjusted artist rating; and using the adjust artist rating in the step of generating a list of artists.

11. A method of distributing songs on a personalized music station, the method comprising the step of:

receiving user artist block ratings for each of a plurality of predefined artist blocks;

using the artist blocks rating to produce an artist rating for each artist in the artist blocks, each artist block comprising a grouping of a plurality of artists related in some way;

generating a first list of artists from at least one of the artist blocks, wherein the number of times each artist appears in the first list is related to the artist rating for each artist;

randomly selecting artists from the first list of artists;

producing a prioritized list of songs for each of the randomly selected artists;

selecting songs from the prioritized list of songs for inclusion in a master playlist; and transmitting songs to the user over a communications network in accordance with the playlist.

12. A method of distributing songs on a personalized music station according to claim 11, further comprising the step of:

editing the master playlist to create a second playlist having less than a first predetermined number of songs by each of the artists and having less than a second predetermined number of adjacent songs by each of the artists.

13. A method of distributing songs on a personalized music station according to claim 11, wherein the step of using the artist block rating to produce an artist rating for each artist in the artist blocks comprises the steps of:

assigning a preliminary rating to each artist categorized within each of the artist blocks; and adjusting the preliminary rating for each artist categorized within each of said artist block in response to the artist block rating for each of the artist blocks.

14. A method of distributing songs on a personalized music station according to claim 12, wherein the step of editing said list of songs comprises the steps of:

selecting a first occurrence of each artist in the master list;

selecting a second occurrence of each artist in the master list; and generating a new list including the first and second occurrences of each artist.

15. A method of distributing songs on a personalized music station according to claim 11, wherein the steps of randomly selecting artists from the list of artists; producing a prioritized list of songs for each of the randomly selected artists; and selecting songs from the prioritized list of songs for inclusion in a master playlist, are repeated following a transmission of a last song on the playlist.

16. A method of distributing songs on a personalized music station according to claim 11, wherein the first list created in the step of generating a list of artists classified within at least one of the artist blocks includes multiple occurrences of at least some of the artists, wherein the number of occurrences is representative of the artist rating.

17. A method of distributing songs on a personalized music station according to claim 11, wherein the step of generating a first list of artists comprises the steps of:

producing a master list of the artists, the master list including multiple occurrences of said artists, wherein the number of occurrences is representative of the artist rating;

assigning a random number to each artist in the master list of artists; and using the random number to select songs for the list of artists.

18. A method of distributing songs on a personalized music station according to claim 11, wherein the step of producing a prioritized list of songs comprises the steps of:

assigning a song rating to each of the songs;

producing a master list of the songs, the master list including multiple occurrences of said songs, wherein the number of occurrences is representative of the song rating;

assigning a random number to each song in the master list; and using the random number to select songs for the prioritized list.

19. A method of distributing songs on a personalized music station according to claim 11, further comprising the step of:

adding additional artists to the first list of artists; and assigning a rating to the additional artists.

20. A method of distributing songs on a personalized music station according to claim 11, further comprising the step of:

adjusting the artist rating for selected ones of the artists to produce an adjusted artist rating; and using the adjust artist rating in the step of generating the first list of artists.

* * * * *